United States Patent
Yeung et al.

(10) Patent No.: US 8,149,217 B2
(45) Date of Patent: Apr. 3, 2012

(54) CREATING RESPONSES FOR AN ELECTRONIC PEN-COMPUTER MULTIMEDIA INTERACTIVE SYSTEM

(75) Inventors: Minerva M. Yeung, Los Altos Hills, CA (US); Boon-Lock Yeo, Los Altos Hills, CA (US); Dan Li, Shanghai (CN); Xing Tang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 374 days.

(21) Appl. No.: 10/579,048

(22) PCT Filed: Dec. 19, 2003

(86) PCT No.: PCT/CN03/01088
§ 371 (c)(1),
(2), (4) Date: May 9, 2006

(87) PCT Pub. No.: WO2005/059731
PCT Pub. Date: Jun. 30, 2005

(65) Prior Publication Data
US 2007/0040809 A1      Feb. 22, 2007

(51) Int. Cl.
*G09G 5/00* (2006.01)
(52) U.S. Cl. .................. 345/173; 345/179; 178/18.01
(58) Field of Classification Search .......... 345/156–184; 178/18.01
See application file for complete search history.

(56) References Cited

U.S. PATENT DOCUMENTS

| | | | |
|---|---|---|---|
| 5,404,458 A * | 4/1995 | Zetts | 710/73 |
| 5,739,814 A * | 4/1998 | Ohara et al. | 345/173 |
| 6,040,825 A * | 3/2000 | Yamamoto et al. | 345/173 |
| 6,191,777 B1 * | 2/2001 | Yasuhara et al. | 345/173 |
| 6,297,812 B1 * | 10/2001 | Ohara et al. | 345/173 |
| 6,540,141 B1 | 4/2003 | Dougherty | |

(Continued)

FOREIGN PATENT DOCUMENTS

CN    1178594 A    12/1996

(Continued)

OTHER PUBLICATIONS

PCT/CN03/01088 Int'l Search Report dated Aug. 26, 2004.

(Continued)

*Primary Examiner* — Amare Mengistu
*Assistant Examiner* — Vinh Lam
(74) *Attorney, Agent, or Firm* — Grossman, Tucker, Perreault & Pfleger, PLLC

(57) ABSTRACT

A system for associating a selected object on any printed material to a valid response provided by a computer system includes a maker component to define an object on a page of printed material, and to link a position of the object on the page, the contents of the page, and the response to be performed by a computer system. The system also includes a pointing device to determine a position on the printed material, a communicating device to transmit the position to the computer system, and a player component to correlate the position to selected digital content associated with the printed materials, the selected digital content being accessible by the computer system; and to provide a valid response to a user based at least in part on the position and the correlated content, wherein the valid response includes at least one of rendering audio content, rendering video content, rendering image content, and performing an action by the computer system.

20 Claims, 9 Drawing Sheets

U.S. PATENT DOCUMENTS

| | | | |
|---|---|---|---|
| 7,081,885 B2 * | 7/2006 | Blume | 345/173 |
| 7,091,960 B1 * | 8/2006 | Silverbrook et al. | 345/173 |
| 7,106,309 B2 * | 9/2006 | Wood et al. | 345/173 |
| 7,283,129 B1 * | 10/2007 | Sawada et al. | 345/204 |
| 2002/0041271 A1 * | 4/2002 | LeKuch et al. | 345/173 |
| 2002/0087598 A1 | 7/2002 | Carro | |
| 2002/0120635 A1 | 8/2002 | Joao | |

FOREIGN PATENT DOCUMENTS

| | | | |
|---|---|---|---|
| CN | 1178594 A | | 4/1998 |
| CN | 1347065 | | 5/2002 |
| GB | 2 365 614 A | | 2/2002 |
| JP | 7152390 | | 6/1995 |
| JP | 10268742 | | 10/1998 |
| JP | 1173087 | | 3/1999 |
| JP | 2001/056749 | | 2/2001 |
| KR | 100847943 B1 | | 7/2008 |
| WO | 00/21025 A1 | | 4/2000 |

OTHER PUBLICATIONS

PCT/CN03/01087 Int'l Search Report dated Jul. 15, 2004.

Notice of Allowance received for Japanese Patent Application No. 2005-512143, mailed on Apr. 13, 2010, 1 page of Notice of Allowance and Partial English translation of 1 page.

International Search Report for International Patent Application No. PCT/CN2003/001088, mailed on Aug. 26, 2004. 7 pages.

European Search Report received for EP Patent Application No. 03767374.6 mailed on Oct. 4, 2011, 3 pages.

* cited by examiner

CREATING RESPONSES FOR AN ELECTRONIC PEN-COMPUTER MULTIMEDIA INTERACTIVE SYSTEM

BACKGROUND

1. Field

The present invention relates generally to computer systems and, more specifically, to new usage models for personal computers (PCs) in a multimedia interactive mode.

2. Description

Many different input devices have been developed over the years for computer systems such as PCs. Devices such as mice, trackballs, touch screens, joysticks, and so on have been used by both sophisticated and unsophisticated computer users to varying degrees of success. For some unsophisticated users such as small children or the elderly, manipulating these input devices has sometimes been problematic, thereby potentially limiting their enjoyment in using PCs.

One relatively recent advance in input methods is the electronic pen. Users may use an electronic pen to write on traditional paper. The electronic pen sends a wireless signal containing coordinate information to a receiver. The receiver can calculate the pen tip's position information and send this information to the PC. This solution is one of the most natural input methods for a PC. The user can write anything on normal paper. The electronic pen can obtain the absolute position of the pen tip without any dependence on the contents of the written material. Some applications have already been enabled using electronic pen technology. In one example, a pen application can capture a user's handwriting and integrate what has been written into an application program (such as an electronic mail (e-mail) program) in order to send an e-mail containing an image of the handwriting. The electronic pen has also been used as a selection device (much as a mouse is used) to control a window's cursor.

Because use of the electronic pen is more natural than other input methods, it may find utility, especially for unsophisticated computer users. For example, small children and the elderly who have difficulty using a keyboard may be able to effectively input information using the pen. The electronic pen may be especially useful for entering information in Asian languages (such as Chinese) into computers.

In addition, electronic books and/or courseware have become more popular because of the inherent support in these materials for multimedia functions. Users may enjoy audio, video, and still images on a PC and get more information from these materials than from a text-only product. However, readers continue to enjoy the convenience and widespread availability of conventional paper books.

BRIEF DESCRIPTION OF THE DRAWINGS

The features and advantages of the present invention will become apparent from the following detailed description of the present invention in which.

DETAILED DESCRIPTION

Embodiments of the present invention introduce a new usage model for computer systems based on the combination of an electronic pen position location system and traditional paper books. Embodiments of the present invention provide a method to link electronic books and/or courseware with traditional paper books. By using the present invention, a user can enjoy multimedia content on a computer system (such as a PC), while reading a book. The present invention provides interactivity offered by a PC, but based directly on content selected from an existing paper book. Portions of the book's contents may be processed by the system prior to usage by a user in order to set up the linkages between the book's contents and multimedia content stored on the computer system.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
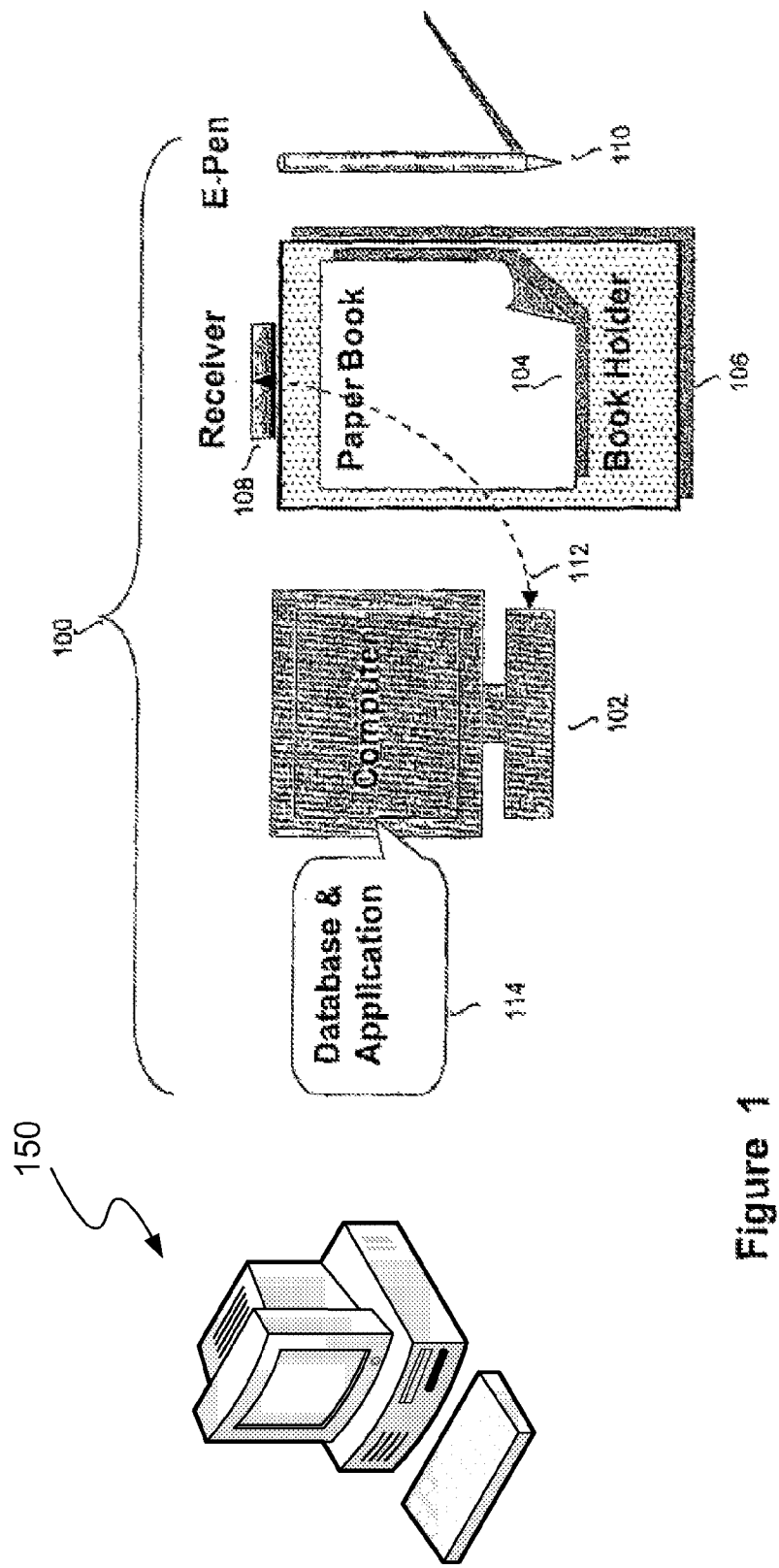
FIG. 1 is a diagram of an electronic pen-computer multimedia interactive system according to an embodiment of the present invention.

FIG. 1 is a diagram of an electronic pen-computer multimedia interactive system 100 according to an embodiment of the present invention. In embodiments of the present invention, a computer system 102 interacts with a traditional paper book 104 being read by a user. The term "book" as used herein may be any pre-existing printed material, such as a fiction or non-fiction book, a periodical such as a magazine, newspaper, or a journal, a coloring book, a pamphlet, an advertisement, and so on. The book may be placed by the user so as to reside on a book holder 106, which holds the book in a fixed relationship to a receiver device 108. An electronic pen (E-pen) 110 may be used by the user to point to and/or write on the book 104. The position of the electronic pen may be determined by the receiver and forwarded over a communications link 112 to the computer system. The communications link may comprise any wired or wireless connection, such as a COM port, universal serial bus (USB), LPT, any variation of implementation of the 802.11 wireless standards, Bluetooth, infrared, and so on.

The computer system includes at least one database and an application 114 to accept the position information of the electronic pen and an indication of what book is being read by the user, and to render multimedia content on the computer system or to provide a selected action in response to reception of the position information. Generally, the responses may include playing one or more of audio content, playing video content, displaying an image or text, or any other multimedia information, or taking a pre-defined action on the computer system (such as adjusting the speaker volume, tuning the display brightness, or powering off the computer system, for example). The responses may be set up in advance of the user reading the book such that the application executing on the computer system links position information of the electronic pen over portions of pages of the conventional, pre-existing published book with selection of an appropriate computer system response.

Embodiments of the present invention may be used as follows. The receiver 108 may be fixed on top of the book holder 106, while the book 104 is put on the book holder by the user. This means the distance between the book and receiver is fixed. In at least one embodiment, the fixed relationship may include one corner and two sides of the book being situated against a fixed 90 degree angle structure of the book holder. When the user uses the electronic pen 110 to select contents of the book on a currently viewed page, the tip position information may be calculated by the receiver 108 and sent to the computer system 102. At least one database may be included in the computer system. The at least one database contains action/response information corresponding to the current E-pen position, the contents of the book for the current page, and stored multimedia contents. The database or portions thereof may be local to the computer system 102, or may be stored and accessed externally from the computer system using well-known techniques, such as over the Internet, for example. An application receives the position information, searches the at least one database for an entry correlated to the position information and book contents, and then plays the corresponding multimedia content or takes a corresponding pre-defined action. In at least one embodiment, the multimedia content may be played on consumer electronics devices such as televisions, stereos, computer display monitors, etc., that may be communicatively coupled with the computer system.

One usage of embodiments of the present invention is the teaching of the English alphabet. For example, the book may contain 26 pages, each page containing a letter of the alphabet. A first page may contain a large letter "A" and pictures of different types of apples or other objects starting with the letter "A". When the user selects the letter "A" on that page of the book (perhaps by depressing a button on the E-pen or touching the E-pen to the paper), the application on the computer system causes the computer to emit the sounds for the word "apple", for example, via the computer system's speaker. At substantially the same time, the computer system may also be used to show more pictures or play a video of apples of different sizes and colors (for example). Thus, embodiments of the present invention take the contents of a pre-existing book and combine this content with the interactivity of a computer system for enhanced information flow and education/entertainment purposes. When used for education, the present invention combines the power of an existing or newly published traditional paper book with the power of a computer system (in terms of multimedia, and Internet access in some embodiments).

With embodiments of the present invention, many other usage modes are possible. For example, different modes of educational systems may be designed for different age groups. For children two to four years of age, an application and related database that teach simple words, alphabets, and numbers can be created based on existing books for such purposes. For children five to seven years of age, an application and related database that teach sentences can be created. In other settings, other modes are possible, and the present invention is not limited in this respect. For example, an application and related database that allows tourists to get more information from an existing printed map can be created. In another example, an application that allows for virtual remote control for electronic devices in the home may be created using the system and techniques described herein.

Figure 2:
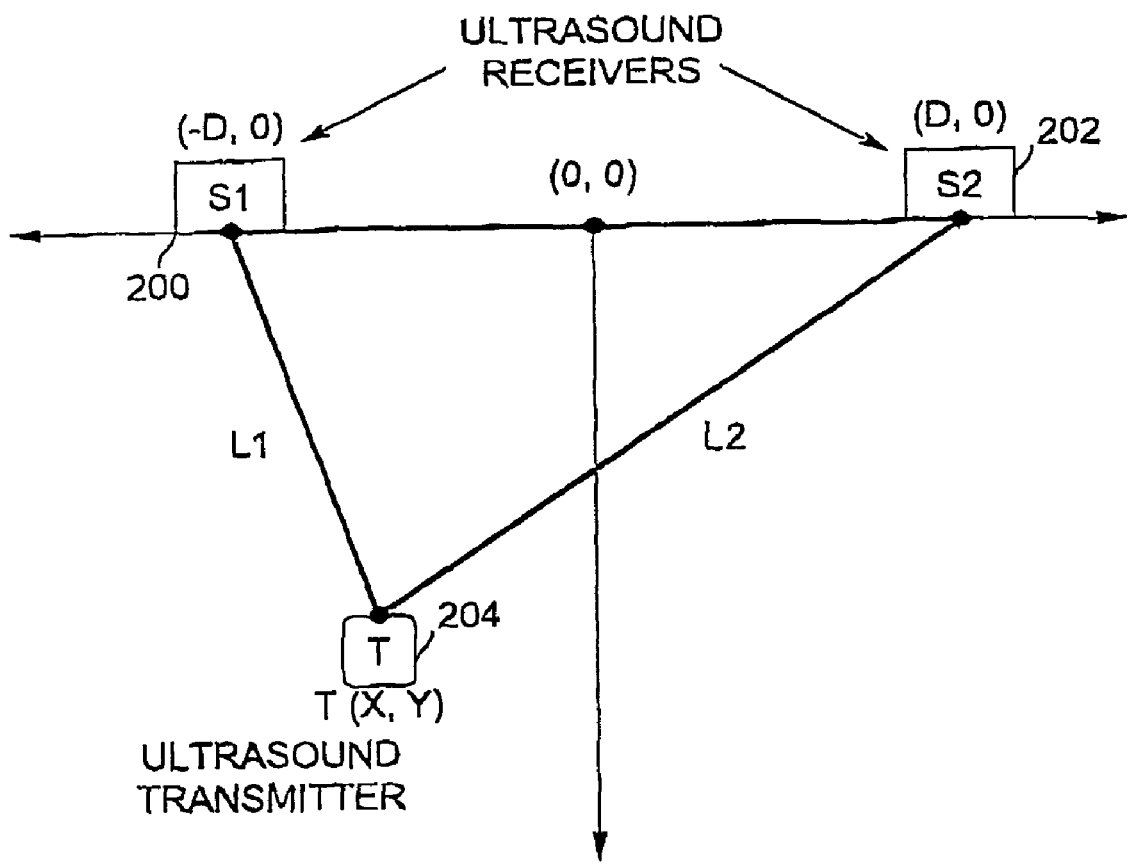
FIG. 2 is a diagram illustrating an electronic pen system according to an embodiment of the present invention.

FIG. 2 is a diagram illustrating an electronic pen system according to an embodiment of the present invention. The E-pen system obtains absolute tip position information on a page of a book. At least two ultrasound sensors S1 200 and S2 202 may be arranged on a line in the receiver 108, equidistant from a coordinate system origin (0, 0), as noted by (D, 0) and (−D, 0), respectively. The E-pen 110 comprises an ultrasound transmitter T 204. When the pen tip is down, the transmitter sends an ultrasound signal detectable by the receivers. Since the distances L1=(T, S1) and L2=(T, S2) are different, the ultrasound signal reaches the two sensors at different times. The receiver 108 may detect the time difference and calculate the length of L1 and L2. The position of T may then be calculated by equation 1:

$$\begin{cases} x = \frac{l_1^2 - l_2^2}{4d} \\ y = \sqrt{l_2^2 - \left(\frac{l_1^2 - l_2^2 - 4d^2}{4d}\right)^2} \end{cases}$$

The X and Y coordinates specify the absolute position information of the pen tip. The E-pen system sends this information to the computer system 102 over connection 112.

Once the position information is received by the user's computer system 102, the information may be processed by an application program called a "player" component herein. The player receives the position information, searches in at least one database for corresponding multimedia content and/or an appropriate action, and plays the corresponding multimedia and/or performs the action. The user interacts with the player in order to make a traditional paper book into an interactive user experience. The user uses the E-pen to select an object on the book, and the player provides the corresponding response based on the pen tip position and the object type.

Prior to use, at least one database must be generated to contain action/response information relating the pen tip position, current book contents, current page of the book, multimedia contents for the current book, and pre-defined actions for the current book. An application program executing on a publisher's computer system 150, FIG. 1, called a "maker" component herein may be used to create the linkages between these data items. The maker may be used by a publisher (or in some cases by a sophisticated user) to make an interactive multimedia product based on an existing traditional paper book (or possibly a newly published book), with limited manual work. The input data to the maker includes the page images of the book, additional multimedia content, and pre-defined actions. The publisher selects an object on a page image, and links the relevant multimedia content and/or action with the selected object. All linkage information may be stored in the at least one database.

In one embodiment, the publisher's computer system may be the same as the user's computer system for the case where the interactive multimedia product and/or the book are produced by the user or another person at the user's site (e.g., a parent prepares the linkages for use by a child). In one embodiment, the multimedia content may comprise one or more of digital images, digital video, digital audio files, and text files produced by or obtained by the user. In one embodiment, the user may provide digital images as the pages of the book (e.g., the user's original digital photographs) and specify the linkages of objects on each page of the book with the multimedia content.

Figure 3:
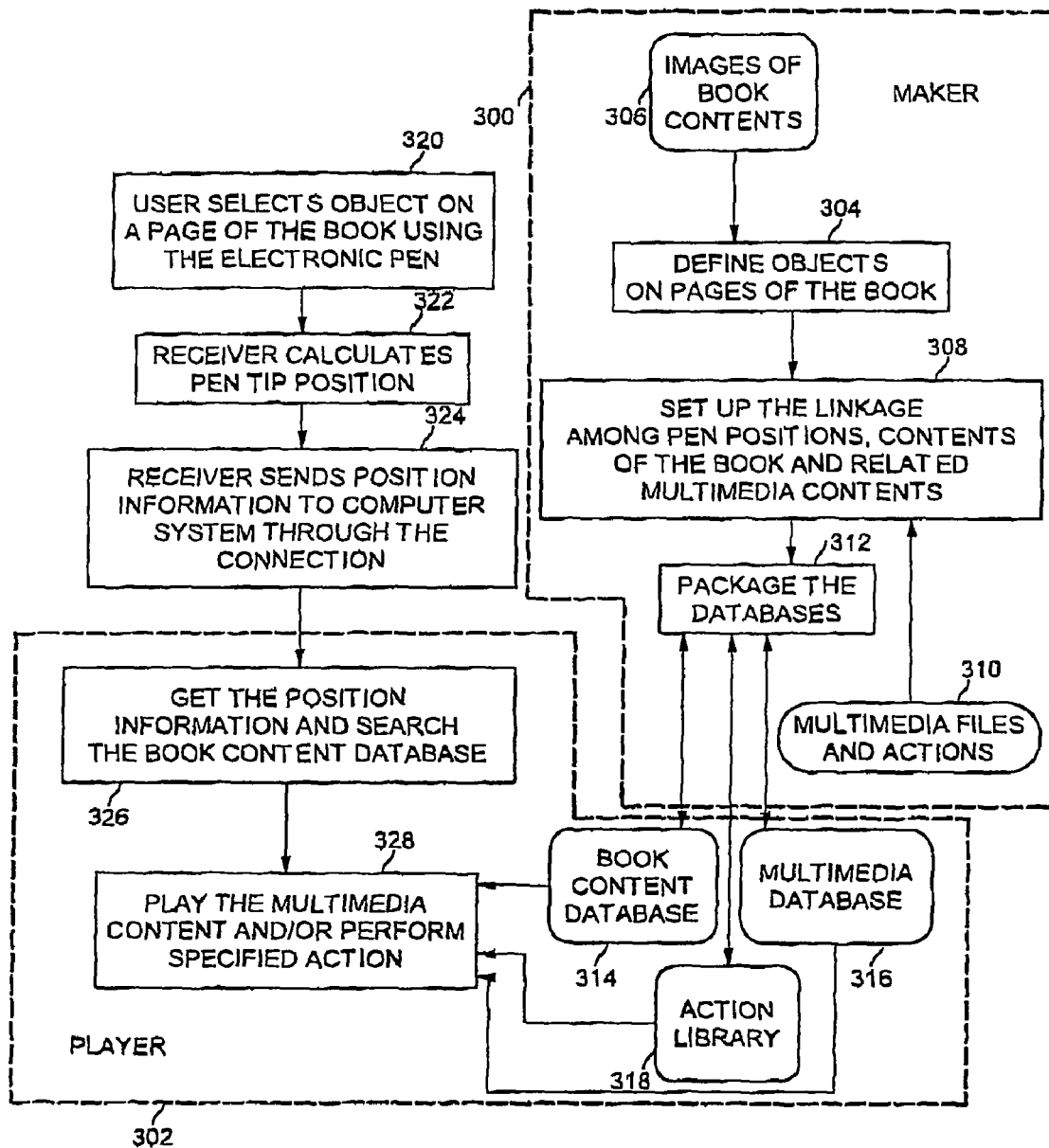
FIG. 3 is a flow diagram of a maker component and a player component in a multimedia system according to an embodiment of the present invention.

FIG. 3 is a flow diagram of a maker component 300 and a player component 302 in a multimedia system according to an embodiment of the present invention. At block 304, the maker component 300 accepts as input images of one or more pages of a book and then defines zone information for objects represented on those pages. In one embodiment, the maker may accomplish this through interaction with a system user acting as a publisher of the multimedia content. At block 308, the maker sets up the linkage between pen positions, the contents of the book (e.g., objects found on pages of the book), and related multimedia contents (e.g., associated audio, video, images, text, and so on) and/or actions, using multimedia files and actions 310 as input data. At block 312, the maker packages the databases for subsequent use by the player component 302. In one embodiment, the publisher provides the multimedia files when operating the maker component and installs them in the databases distributed to the user's computer system with the player component. In another embodiment, the publisher provides links to the multimedia files accessible over a network such as the Internet. In this embodiment, the player component obtains the files as needed using a known file transfer protocol or the well known hyper text transfer protocol (HTTP).

The databases comprise at least a book content database 314, a multimedia database 316, and an action library 318. The book content database contains the images of pages of the book, positional information about objects on the pages, and linkage information between the objects and multimedia contents or actions/responses. The multimedia database contains audio, video, images, text, and other data corresponding to objects on pages of the book for rendering for perception by the user. The action library 318 contains directives for pre-defined actions to be performed by the user's computer system when the position of the electronic pen coincides with an object on a page of the book indicating the associated action. In one embodiment, the actions may include selecting a human language for subsequent communication, adjusting the volume of a speaker, adjusting the brightness of a computer monitor, sending commands to an input/output (I/O) port, powering off the computer system, and so on. Other actions are also contemplated. In one embodiment, the three databases described herein may be combined into a single database.

The databases corresponding to the book may then be distributed using any known mechanism to the user's computer system. After the player application is installed on the user's computer system, the user may put the book on the book holder, start up the player component 302 on the computer system, and begin to interact with the book. When the user selects an area on the book or book holder that has meaning to the system, the user has selected a valid input. In one embodiment, selecting other areas by the user may be ignored by the system. At block 320, the user selects an object represented on a page of the book using the electronic pen. At block 322, the receiver calculates the current pen tip position during the selection. At block 324, the receiver 108 sends the pen tip position information to the computer system 102 using the connection 112. At block 326, the player component running on the computer system receives the position information and searches the book content database 314 to obtain information relating to an object (if any) selected by the current pen position on the current page. If an object is selected and multimedia content and/or an action are associated with the selected object, the player component plays the corresponding multimedia content and/or performs the specified action at block 328. The player component uses data from the multimedia database 316 and the action library 318 in performing block 328. The player component directs the playing of the content on the computer system and/or a communicatively coupled consumer electronics device such as a television.

Figure 4:
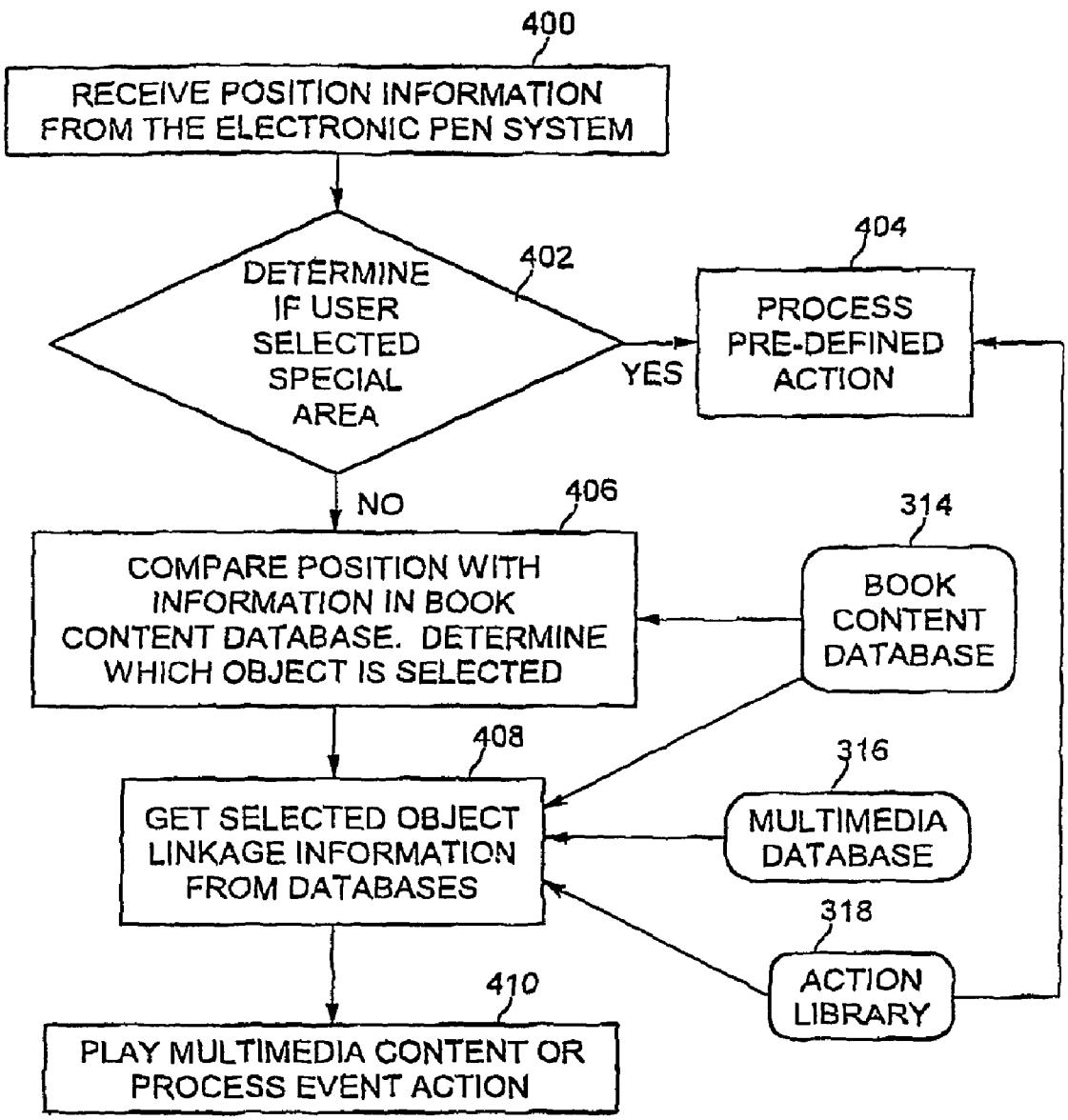
FIG. 4 is a flow diagram of player processing according to an embodiment of the present invention.

FIG. 4 is a flow diagram of player processing according to an embodiment of the present invention. The player receives the current position information from the electronic pen system at block 400. At block 402, the player determines, in one embodiment, based on the current position information of the pen, if the user is selecting a special area on the page of the book, or on the receiver or book holder. If so, the player processes, in one embodiment, a selected pre-defined action at block 404, using the action library 318 as input data. Pre-defined actions may include such things as increasing or decreasing the volume of a speaker, adjusting visual attributes of a computer monitor, selecting a human language for subsequent communication, and so on. Other actions may be defined for specific implementations and the present invention is not limited in this respect. In one embodiment, the action may be used to control the player component or the computer system, these actions having no relationship with the book's contents. If the current pen position information does not indicate a special area, then the player compares the position information with known objects for the page of the book as stored in the book content database 314. The player determines which object of the page is selected (if any) at block 406, based on boundary coordinates of the object and the current pen position information. If an object is selected, the player at block 408 gets the selected object's linkage information from one or more of the book content database, the multimedia database 316, and the action library 318. At block 410, the player plays the linked multimedia content or processes an action based on the object linkage information.

Before the user can cause the rendering of related multimedia content or cause related actions to be performed on the computer system as a result of selecting an object on a page of a book using the electronic pen, the databases must be populated and the linkages between objects, positions and content and actions must be set up. This processing may be performed by a maker component according to embodiments of the present invention. The present maker solves the problem of how to create electronic material from a traditional book with limited effort by a publisher or user. Embodiments of the present invention provide a general method for creating actions/responses on a computer system from paper books. Based on the present invention, the publisher or user can create interactive multimedia material linked to the existing or newly published traditional paper book with limited manual work.

The maker creates different actions or responses to selection of an object defined on a page of a book. Here, the term "object" may be any zone containing specific meaning on the page (for example, a boy's picture, a picture of an apple, and so on). With limited input by the publisher or user, the maker identifies the object on the page. In various embodiments, the responses include playing audio, video, showing an image, or rendering any other multimedia information, performing a pre-defined action, or executing a logic script based on input from the user. The input data for the maker include page images of a book 500, multimedia contents 502, and a pre-defined action library 318. The output data of the maker includes the book content database 314, the multimedia database 316, and the action library 318. The book content database contains the linkage relationship among objects on each page, multimedia contents in the multimedia database, and pre-defined actions from the action library.

The maker provides three services. First, the maker identifies the objects on a page. The maker determines each object's boundary information based on limited user inputs. Second, the maker creates the linkage among the objects, actions, and responses. For example, if an audio file is linked to an object, when the user selects that object with the electronic pen, the player can then play that audio file. More than one multimedia file and one or more action/response may be linked to each object. Third, the maker packages the databases. When the publisher or user finishes setting up linkages for the pages of a book, the maker packages all of the information into the book content database, the multimedia database, and the action library for distribution with the player to a user's computer system.

Figure 5:
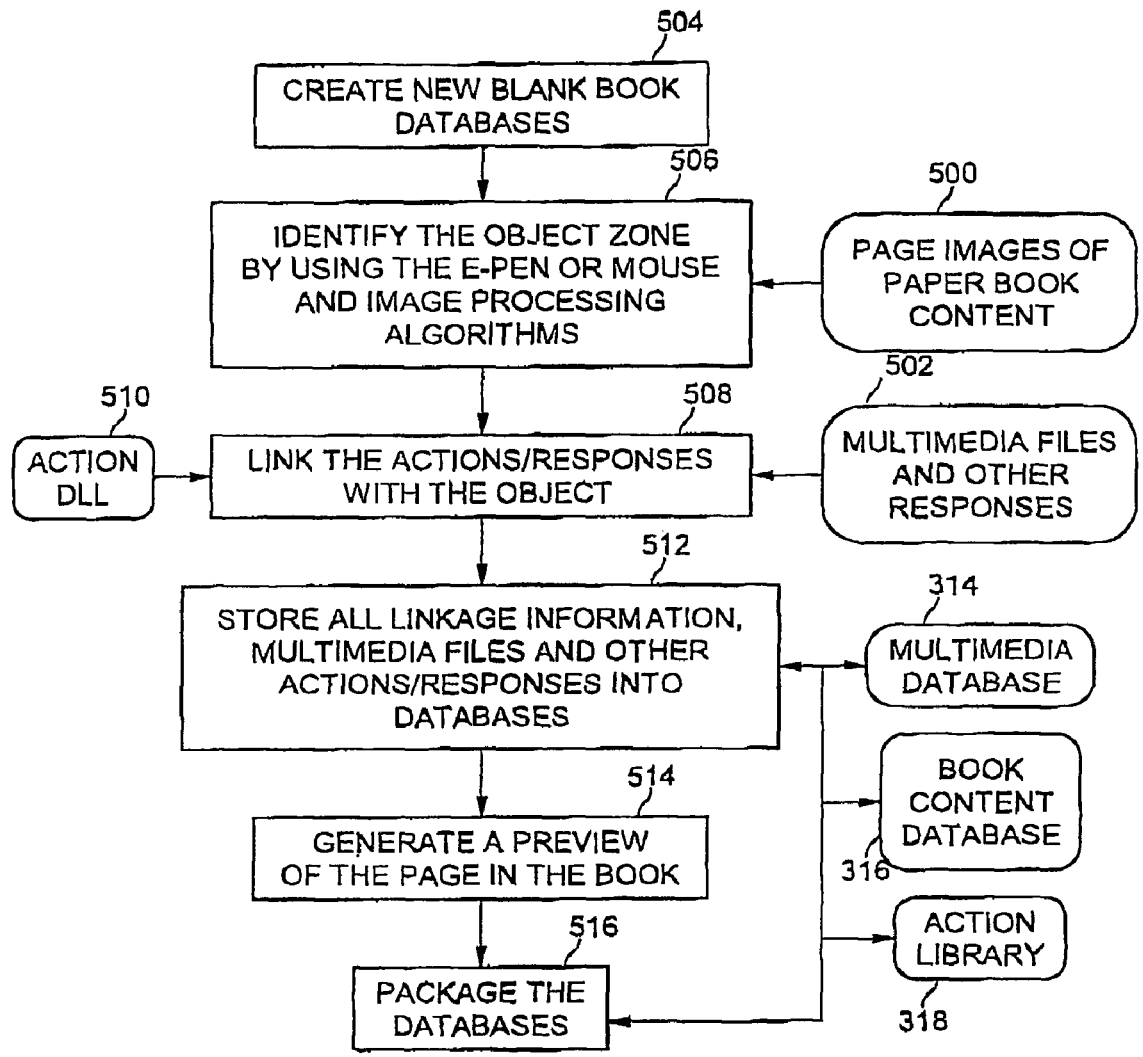
FIG. 5 is a flow diagram of maker processing according to an embodiment of the present invention.

FIG. 5 is a flow diagram of maker processing according to an embodiment of the present invention. At block 504, the maker creates new blank book databases to hold the book contents (e.g., object definitions and linkages), multimedia, and actions. At block 506, in one embodiment, the maker allows the publisher or user to identify an object zone by using the electronic pen or a mouse and image processing algorithms. The page images used by this operation may be obtained by scanning using a scanner or may be pre-existing image files. In one embodiment, a book may be put on the book holder and the page image may be displayed on a monitor of the computer system. In this scenario, the boundary of an object on the displayed page image may be used to define the object.

Figure 6:
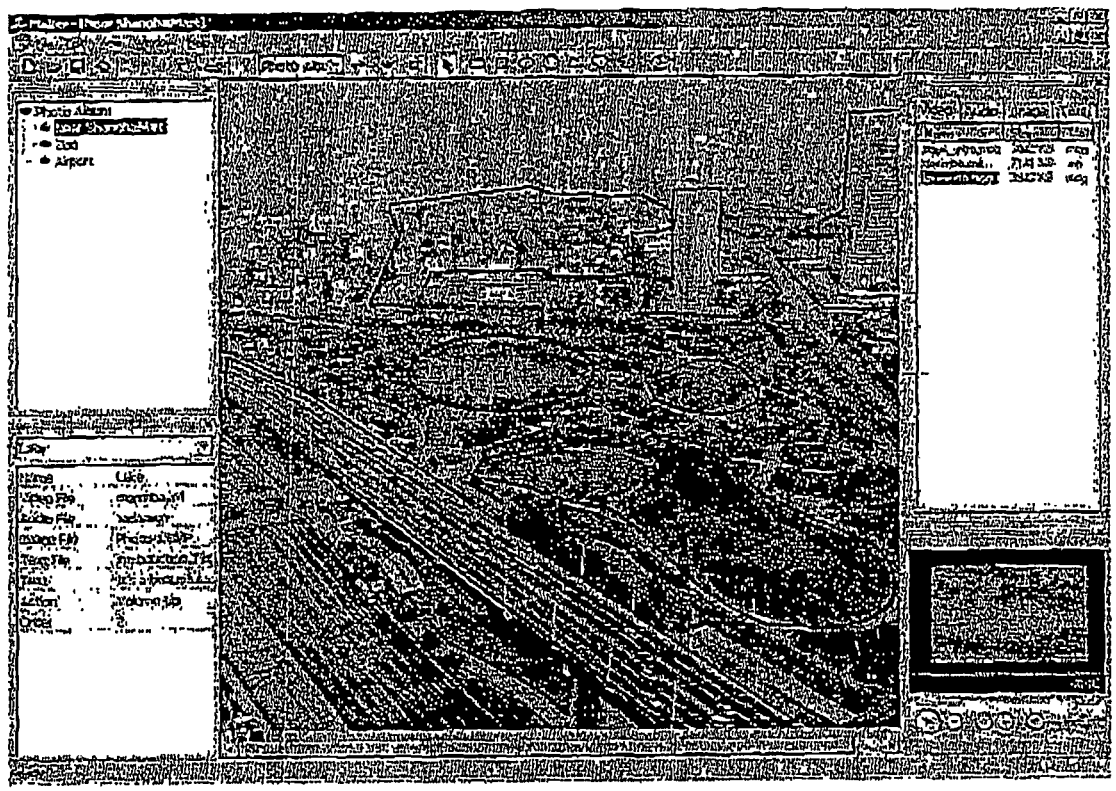
FIG. 6 is an example of object identification processing according to an embodiment of the present invention.

In various embodiments, the maker may use one or more of several methods to identify the objects on the page image. In one embodiment, the publisher or user uses the electronic pen to draw a curve along the boundary of the object on the page of the book, or selects key points on that boundary. The electronic pen system sends the pen position information to the maker, and the maker thus obtains an array of position information of the object. Depending on the publisher's drawing speed, the maker may rescale the set of points and mark them as an object boundary. Alternatively, the publisher may use a mouse to draw a curve along the boundary of the object on the page image as the page image is displayed on the monitor, or the publisher may modify a shape (such as a triangle, rectangle, ellipse or polygon) as is well known in the art to encapsulate the boundary of the object. In yet another embodiment, the publisher may use a mouse to select a set of boundary points of the object displayed on monitor. The maker then applies one or more known digital image processing algorithms to identify the object boundary automatically. For example, known "intelligent scissor" or "magic wand" algorithms may be used. In some embodiments, the algorithms identify objects by examining pixel's gray scale values, colors, and other image information. FIG. 6 is an example of an identification of objects process according to one embodiment of the present invention. In this example, the maker has identified several objects in the page image and created a boundary for each object. In this way, all objects may be determined for a page image.

Next, at block 508, the publisher or user uses the maker to manually create a linkage among the objects, actions, and responses. The publisher or user selects an object and assigns actions and/or responses to the object. In at least one embodiment, there are three kinds of actions/responses.

First, the player may play multimedia contents, including playing video, playing audio, showing one or more images, or showing text. In this case, the publisher links the multimedia files to an object. The maker logs this linkage information and saves the link to the book content database.

Second, the player may execute a pre-defined action other than playing video, audio, images, or text. For example, the pre-defined action may be adjusting the volume of the speaker of the computer system, adjusting brightness of the monitor, sending commands to any I/O port, or any other action affecting the computer system. The pre-defined actions may be classified into groups. Each group may comprise a dynamic link library (DLL) 510. A software interface may be defined between the DLLs and the maker. For example, in one embodiment, "GetActionList (LPSAction a_SActionArray, DWORD dwArrayLength,)" and "CallActionByID (INT ActionID)" application program interfaces (APIs) may be implemented for each DLL. The "GetActionList" function returns all valid action names and their action IDs. The maker can call this API and display the action name list on the maker component's user interface (UI). When the publisher or user links an action name to an object, the maker assigns the corresponding Action ID to that object and saves this linkage information in the book content database. When the player wants to execute the action of the object, the player gets the action ID from the database and calls the "CallAction ByID (INT ActionID)" function. The CallActionByID( ) invokes the specific action based on the Action ID.

Figure 7:
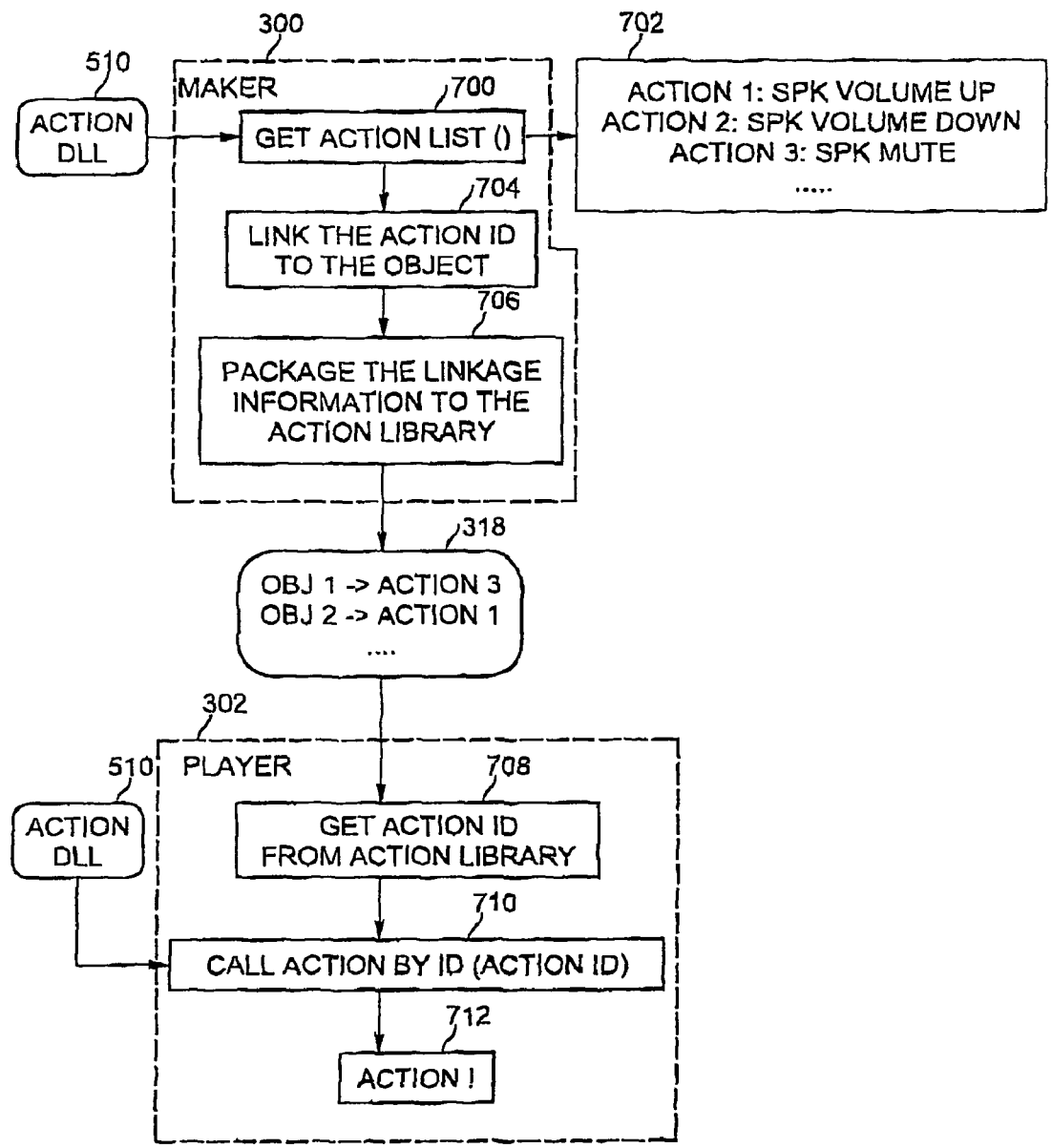
FIG. 7 is a flow diagram of action linkage processing according to an embodiment of the present invention.

This processing is shown in FIG. 7. FIG. 7 is a flow diagram of action linkage processing according to an embodiment of the present invention. At block 700, the maker 300 calls the get action list API, which accesses the action list 702. Each entry in the action list may be indicated by a unique action ID. Some examples of actions are shown in FIG. 7, but other actions may also be used. At block 704, the maker links the action ID to the object currently being processed. At block 706, the maker packages the linkage information to the action library 318. The action library may be subsequently read by the player component 302. At block 708, when a particular object is selected and the object is linked to an action, the player gets the action ID from the action library. At block 710, the player component calls the action by using the action ID and the CallActionByID( ) API. The action is then performed by the computer system at block 712.

Figure 8:
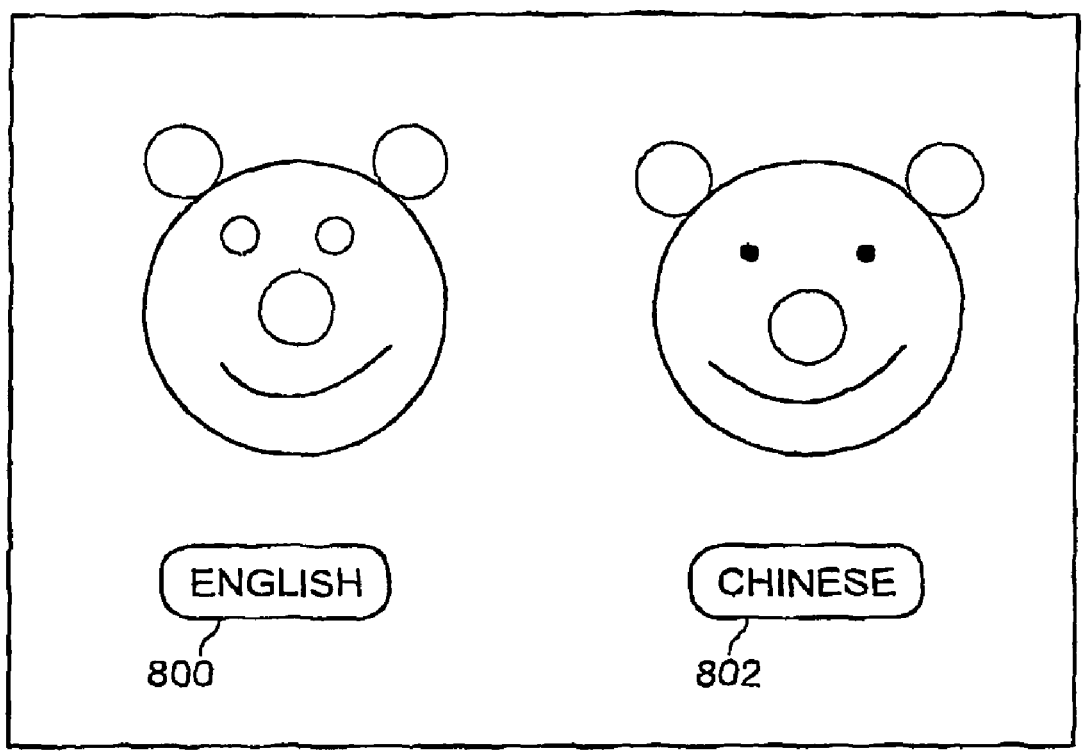
FIG. 8 is an example of a page in a book supported by the present system.

Third, the player may execute complex logic behavior based on previous inputs from users. For example, suppose there are images of animals on the current page of the book, along with two buttons as shown in FIG. 8. When a user selects the "English" button 800 first (using the electronic pen), and then selects any animal's picture on the page, the player plays the audio file (for example) which contains the name of the animal in the English language. However, when the user selects the "Chinese" button 802 first, and then selects an animal's picture, the player plays the audio file which contains the name of the animal in the Chinese language. This is merely an example of complex logic behavior. Many other responses may be made based on successive user inputs.

This logic behavior extends the behavior of an object by adding a publisher's own functionality. In one embodiment, it may be implemented by adding a script language extension ability to the maker 300. In various embodiments, the script language may be any known language for such a purpose, such as VBScript, JScript, JavaScript, PerlScript, PythonScript, etc. In one embodiment, there may be a script module for each page of the book. The publisher or user may design a script function for an object. A page global variable or other functions may also be defined in the script module. The maker may save the script module for each page in the action library 318. The player loads the script module for the current page from the action library and adds the script module to a corresponding script engine (e.g., an executable module for processing scripts). When a user select an object with a script function assigned to it, the player will execute the script function using the script engine.

Figure 9:
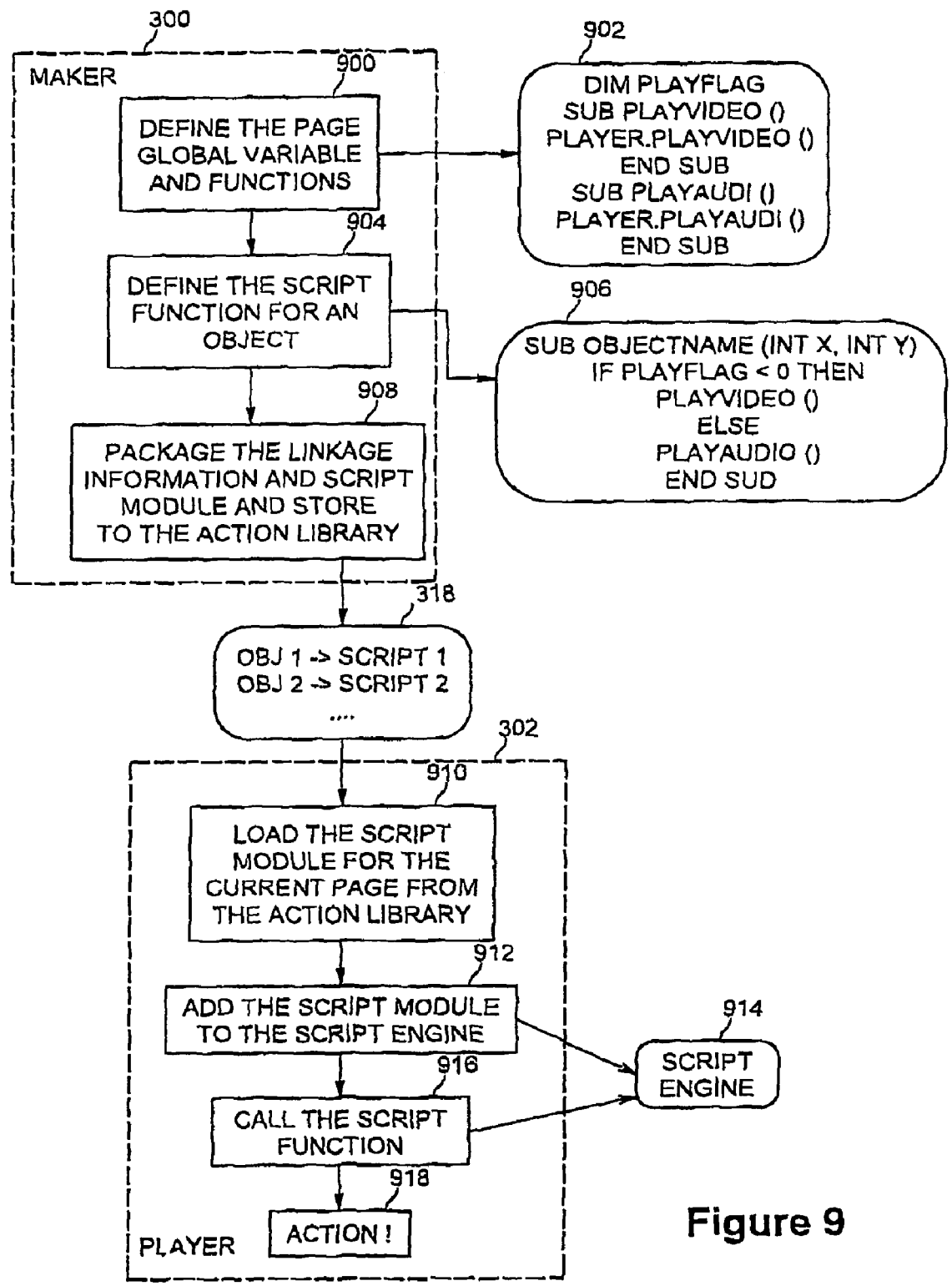
FIG. 9 is a flow diagram of a logic behavior linking process according to an embodiment of the present invention.

FIG. 9 is a flow diagram of this logic behavior linking process according to an embodiment of the present invention. At block 900, the maker defines the page global variable and functions for a selected page of the book. A simplified example of play audio and video functions is show at block 902. At block 904, the maker defines the script function for a selected object. A fragment of a script function example is shown at block 906. At block 908, the maker packages the linkage information and the script function as a script module and stores the linkage information and the script function in the action library. Subsequently, when the user is interacting with a current page of the book, the player loads the script module for the current page from the action library at block 910. At block 912, the player adds the script module 914 to the script engine. In one embodiment, the script engine may be VBScript or Jscript as provided by versions of the Windows operating system commercially available from Microsoft Corporation. At block 916, the player may call the script function when the user selects an object linked to a script. The call to the script function results in the script engine processing the script associated with the selected object. At block 918, the action is performed as a result of the operation of the script engine.

Returning back to FIG. 5, at block 512, the maker stores all linkage information, multimedia files, and other actions/responses into the appropriate places in the multimedia database, the book content database, and the action library. At block 514, in one embodiment, the maker generates a preview of the page in the book for verification by the publisher or user that the intended linkages have been stored. At block 516, the maker packages the databases 318 for subsequent distribution to the user's computer system.

Embodiments of the present invention provide at least the following advantages over existing multimedia systems. The user can use the electronic pen as the form of input. This is the most natural input method for a computer system such as a PC. With this input method, the present invention can be used by people who are not familiar with typing on a keyboard. The user can still read or look at the traditional book. In the meantime, the user can also control getting multimedia information from the PC. This means that the user can enjoy both the advantages of paper books and the multimedia capabilities that the computer offers, including audio, video, images, and text available locally or via a network such as the Internet. Additionally, new usage models are enabled by embodiments of the present invention. In just two examples, an educational system can be provided using embodiments of the present invention which allows children to learn a language, and tourists can use the invention to get more active information from a traditional map. Many other usage models are possible with the present invention.

Thus, described herein are methods and apparatus to accelerate the conversion from traditional books to interactive multimedia books requiring limited user input. A publisher may use the techniques described herein to build interactive materials based on existing paper books. The present invention provides multiple methods to identify objects on the page. A publisher or user can either use the electronic pen to define the boundary of the object on the paper, or use a mouse to define the boundary of the object on the computer system's monitor with the assistance of known digital image processing algorithms. Additionally, actions may be enabled for a book. This means the user may control the computer system through interaction with a page of a book. Finally, logic behavior may be enabled for a book. This feature extends the book's contents in an infinite number of ways. For example, an existing book may be transformed into a virtual multi-language learning book, a virtual musical instrument, or a virtual remote controller for a consumer electronics device. Other applications are contemplated with embodiments of the present invention.

Although the operations described herein ma be described as a sequential process, some of the operations may in fact be performed in parallel or concurrently. In addition, in some embodiments the order of the operations may be rearranged without departing from the spirit of the invention.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
providing a book consisting of one or more pages of printed material;
defining, using a first computer system, an object on a digital page image wherein the digital page image represents at least one page of the one or more pages of printed material;
linking, using the first computer system, a position of the object on the digital page image to a related response to be performed by a second computer system, wherein the position of the object on the digital page image corresponds to a physical position in the one or more pages of printed material which is identified by the second computer system when the book has been placed in a printed material holder by a user, the printed material holder being coupled to the second computer system, wherein a position of the digital page image is defined by a relative position of the book to a known physical location of the printed material holder,
generating a database external to the second computer system, the database comprising a book content database, a multimedia database, and an action library including related response information corresponding to the position of the object;
determining a position of an object selected by the user using the second computer system; and
receiving response information from the database, the response information corresponding to the object selected by the user; and
performing said response on the second computer, said response comprising playing an audio file.

2. The method of claim 1, wherein the response further comprises at least one of rendering video content, rendering image content, and rendering text content.

3. The method of claim 2, wherein the multimedia database comprises digital multimedia content including audio content, video content, image content, and text content; wherein the printed material content database includes positional information about objects on the digital page images and linkage information between the objects on the digital page images and at least one of the multimedia contents and actions; and wherein the action library includes directives for actions to be performed on the second computer system.

4. The method of claim 2, wherein defining the object on the digital page image comprises using an electronic pen to outline boundaries of the object on the digital page image.

5. The method of claim 2, wherein defining the object on the digital page image comprises using an electronic pen to select key points on the boundary of the object on the digital page image.

6. The method of claim 2, wherein defining the object on the digital page image comprises using a mouse to manipulate a graphical object on a display to encapsulate the boundary of the object on the digital page image as displayed on the display.

7. The method of claim 2, wherein defining the object on the page comprises using a mouse to select key points on the boundary of the object on the page as displayed on a display.

8. The method of claim 2, wherein the one or more pages of printed material comprises material generated by a user.

9. A non-transitory computer readable storage medium having a plurality of machine accessible instructions stored thereon, wherein when the instructions are executed by a processor, the instructions cause the processor to:
define an object on a digital page image representing a page of printed material wherein the page of printed material is included in a book consisting of one or more pages of printed material; and
link a position of the object on the digital page image to a related response to be performed by the computer system, wherein the position of the object on the digital page image corresponds to a physical position in the one or more pages of printed material which is identified by a computer system when the book has been placed in a printed material holder by a user, the printed material holder being coupled to the computer system, wherein a position of the digital page image is defined by a relative position of the book to a known physical location of the printed material holder,
generate a database external to the second computer system, the database comprising a book content database, a multimedia database, and an action library including related response information corresponding to the position of the object;
determine a position of an object selected by the user using the second computer system; and
receive response information from the database, the response information corresponding to the object selected by the user; and
perform said response on the second computer, said response comprising playing an audio file.

10. The non-transitory medium of claim 9, wherein the response further comprises at least one of rendering video content, rendering image content, and rendering text content.

11. The non-transitory medium of claim 10, wherein the multimedia database comprises digital multimedia content including audio content, video content, image content, and text content; wherein the printed material content database includes positional information about objects on the digital page images, and linkage information between the objects on the digital page images and at least one of the multimedia contents and actions; and wherein the action library includes directives for actions to be performed on the computer system.

12. The non-transitory medium of claim 10, wherein instructions for defining the object on the digital page image comprise instructions for using an electronic pen to outline boundaries of the object on the digital page image.

13. The non-transitory medium of claim 10, wherein instructions for defining the object on the digital page image comprise instructions for using an electronic pen to select key points on the boundary of the object on the digital page image.

14. The non-transitory medium of claim 10, wherein instructions for defining the object on the digital page image comprise instructions for using a mouse to manipulate a graphical object on a display to encapsulate the boundary of the object on the digital page image as displayed on the display.

15. The non-transitory medium of claim 10, wherein instructions for defining the object on the digital page image comprise instructions for using a mouse to select key points on the boundary of the object on the digital page image as displayed on a display.

16. The non-transitory medium of claim 10, wherein the one or more pages of printed material comprises material generated by a user.

17. A system comprising:
a pointing device to determine a position on a page of printed material wherein the page of printed material is included in a book consisting of one or more pages of printed material, wherein the book is to be placed on a printed material holder by a user, and wherein the position on the one or more pages of printed material is defined by a relative position of the book to a known physical location of the printed material holder;

a communicating device coupled to the printed material holder to transmit the position to a computer system;

a maker component to define an object on a digital page image representing a page of the printed material; and to link a position of the object on the digital page image to a related response to be performed by the computer system, wherein the related response to be performed by the computer system comprises rendering multimedia content to be provided to the user while reading the book and linked to the position of the object, wherein the multimedia content is different from the object; and a player component to correlate the pointed position to selected content associated with the printed material, the selected content being accessible by the computer system; and to provide a valid response to the user based at least in part on the pointed position and the correlated content, wherein the valid response includes at least one of rendering audio content, rendering video content, rendering image content, rendering text content, and performing an action by the computer system.

18. The system of claim 17, wherein the pointing device comprises an electronic pen.

19. The system of claim 17, further comprising a multimedia database to store digital multimedia content, a printed material content database to store positional information about objects on the digital page images and linkage information between the objects on the digital page images and at least one of the multimedia contents and actions, and an action library to store directives for actions to be performed on the system.

20. The system of claim 17, wherein the printed material comprises material generated by a user.

* * * * *